(12) United States Patent
Corston et al.

(10) Patent No.: US 7,287,012 B2
(45) Date of Patent: Oct. 23, 2007

(54) MACHINE-LEARNED APPROACH TO DETERMINING DOCUMENT RELEVANCE FOR SEARCH OVER LARGE ELECTRONIC COLLECTIONS OF DOCUMENTS

(75) Inventors: Simon H. Corston, Seattle, WA (US); Raman Chandrasekar, Seattle, WA (US); Harr Chen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 10/754,159

(22) Filed: Jan. 9, 2004

(65) Prior Publication Data

US 2005/0154686 A1  Jul. 14, 2005

(51) Int. Cl.
  *G06F 15/18* (2006.01)
  *G06F 17/00* (2006.01)
(52) U.S. Cl. ................................. 706/12; 707/E17.108
(58) Field of Classification Search .................... 706/12
See application file for complete search history.

(56) References Cited

U.S. PATENT DOCUMENTS

| | | | | |
|---|---|---|---|---|
| 5,341,142 A | * | 8/1994 | Reis et al. | 342/64 |
| 5,640,409 A | * | 6/1997 | Ito et al. | 372/45.01 |
| 5,671,333 A | * | 9/1997 | Catlett et al. | 706/12 |
| 5,701,400 A | * | 12/1997 | Amado | 706/45 |
| 5,729,452 A | * | 3/1998 | Smith et al. | 701/29 |
| 5,768,417 A | * | 6/1998 | Errico et al. | 382/186 |
| 5,774,357 A | * | 6/1998 | Hoffberg et al. | 713/600 |
| 5,799,276 A | * | 8/1998 | Komissarchik et al. | 704/251 |
| 5,802,205 A | * | 9/1998 | Emico et al. | 382/187 |
| 5,835,871 A | * | 11/1998 | Smith et al. | 701/29 |
| 5,854,855 A | * | 12/1998 | Errico et al. | 382/187 |
| 5,862,259 A | * | 1/1999 | Bokser et al. | 382/228 |
| 5,875,108 A | * | 2/1999 | Hoffberg et al. | 700/17 |
| 5,884,294 A | * | 3/1999 | Kadar et al. | 706/10 |
| 5,902,477 A | * | 5/1999 | Vena | 210/162 |
| 5,920,852 A | * | 7/1999 | Graupe | 706/26 |

(Continued)

OTHER PUBLICATIONS

Xiangrong Chen; Yuille, A.L.; Computer Vision and Pattern Recognition, 2004. CVPR 2004. Proceedings of the 2004 IEEE Computer Society Conference on vol. 2, Jun. 27-Jul. 2, 2004 pp. II-366-II-373 vol. 2 Digital Object Identifier 10.1109/CVPR.2004.1315187.*

(Continued)

*Primary Examiner*—Michael B. Holmes
(74) *Attorney, Agent, or Firm*—Amin, Turocy & Calvin, LLP (57) ABSTRACT

The present invention relates to a system and methodology that applies automated learning procedures for determining document relevance and assisting information retrieval activities. A system is provided that facilitates a machine-learned approach to determine document relevance. The system includes a storage component that receives a set of human selected items to be employed as positive test cases of highly relevant documents. A training component trains at least one classifier with the human selected items as positive test cases and one or more other items as negative test cases in order to provide a query-independent model, wherein the other items can be selected by a statistical search, for example. Also, the trained classifier can be employed to aid an individual in identifying and selecting new positive cases or utilized to filter or re-rank results from a statistical-based search.

30 Claims, 9 Drawing Sheets

U.S. PATENT DOCUMENTS

| | | | |
|---|---|---|---|
| 5,930,803 A * | 7/1999 | Becker et al. | 707/104.1 |
| 5,933,822 A * | 8/1999 | Braden-Harder et al. | 707/5 |
| 5,978,497 A * | 11/1999 | Lee et al. | 382/133 |
| 6,134,354 A * | 10/2000 | Lee et al. | 382/270 |
| 6,137,499 A * | 10/2000 | Tesler | 345/440 |
| 6,137,899 A * | 10/2000 | Lee et al. | 382/133 |
| 6,137,911 A * | 10/2000 | Zhilyaev | 382/225 |
| 6,161,130 A * | 12/2000 | Horvitz et al. | 709/206 |
| 6,237,739 B1 * | 5/2001 | Mazur et al. | 194/207 |
| 6,259,451 B1 * | 7/2001 | Tesler | 345/419 |
| 6,278,464 B1 * | 8/2001 | Kohavi et al. | 345/440 |
| 6,278,961 B1 * | 8/2001 | Kadtke et al. | 702/189 |
| 6,301,579 B1 * | 10/2001 | Becker | 707/102 |
| 6,373,483 B1 * | 4/2002 | Becker et al. | 345/419 |
| 6,460,049 B1 * | 10/2002 | Becker et al. | 707/104.1 |
| 6,553,365 B1 | 4/2003 | Summerlin et al. | |
| 6,578,032 B1 * | 6/2003 | Chandrasekar et al. | 707/6 |
| 6,697,799 B1 | 2/2004 | Neal et al. | |
| 6,718,324 B2 | 4/2004 | Edlund et al. | |
| 6,892,193 B2 * | 5/2005 | Bolle et al. | 706/20 |
| 6,901,399 B1 * | 5/2005 | Corston et al. | 707/6 |
| 6,978,264 B2 * | 12/2005 | Chandrasekar et al. | 707/3 |
| 6,993,535 B2 * | 1/2006 | Bolle et al. | 707/104.1 |
| 7,020,593 B2 * | 3/2006 | Hong et al. | 703/2 |
| 7,043,468 B2 * | 5/2006 | Forman et al. | 706/46 |
| 7,136,845 B2 * | 11/2006 | Chandrasekar et al. | 707/3 |
| 2003/0225763 A1 * | 12/2003 | Guilak et al. | 707/7 |

OTHER PUBLICATIONS

An adaptive nearest neighbor algorithm for classification Ji-Gang Wang; Neskovic, P.; Cooper, L.N.; Machine Learning and Cybernetics, 2005. Proceedings of 2005 International Conference on vol. 5, Aug. 18-21, 2005 pp. 3069-3074 vol. 5 Digital Object Identifier 10.1109/ICMLC.2005.1527469.*

An Extension of Iterative Scaling for Joint Decision-Level and Feature-Level Fusion in Ensemble Classification Miller, D.J.; Pal, S.; Machine Learning for Signal Processing, 2005 IEEE Workshop on Sep. 28-30, 2005 pp. 61-66.*

Performance Measures for Neyman-Pearson Classification Scott, C.; Information Theory, IEEE Transactions on vol. 53, Issue 8, Aug. 2007 pp. 2852-2863 Digital Object Identifier 10.1109/TIT.2007. 901152.*

Charu C. Aggarwal, et al., On the merits of building categorization systems by supervised clustering, Conference on Knowledge Discovery in Data, 1999, 5 pages, San Diego, California.

Chandra Chekuri, et al., Web Search Using Automatic Classification, Proceedings of WWW-96, 1996, 11 pages.

Jacqueline W.T. Wong, et al., ACTION: Automatic Classification For Full-Text Documents, SIGIR Forum 30, 1996, Shatin, Hong Kong, pp. 26-41.

European Search Report dated Apr. 10, 2006 for European Patent Application Serial No. EP05000023, 3 pgs.

Anna Maria Carminelli-Gregori, et al. Intelligent Web Agents for Information Retrieval and Classification. Proceedings of the International Conference on the Practical Application of Intelligent Agents and Multi-Agent Technology. Apr. 19, 1999 pp. 267-280.

* cited by examiner

MACHINE-LEARNED APPROACH TO DETERMINING DOCUMENT RELEVANCE FOR SEARCH OVER LARGE ELECTRONIC COLLECTIONS OF DOCUMENTS

TECHNICAL FIELD

The present invention relates generally to computer systems, and more particularly to a system and method that employs automated classification techniques to facilitate efficient information retrieval for users seeking information and/or administrators that organize such information.

BACKGROUND OF THE INVENTION

Search or information retrieval systems are common tools enabling users to find desired information relating to a topic. Search engines or other search systems are often employed to enable users to direct user-crafted queries in order to find desired information. Unfortunately, this often leads to frustration when many unrelated files are retrieved since users may be unsure of how to author or craft a particular query, or because queries may be ambiguous. This often causes users to continually modify queries in order to refine retrieved search results to a reasonable number of files.

As an example of this dilemma, it is not uncommon to type in a word or phrase in a search system input query field and retrieve several thousand files—or millions of web sites in the case of the Internet, as potential candidates. In order to make sense of the large volume of retrieved candidates, the user will often experiment with other word combinations to further narrow the list since many of the retrieved results may share common elements, terms or phrases yet have little or no contextual similarity in subject matter. This approach is inaccurate and time consuming for both the user and the system performing the search. Inaccuracy is illustrated in the retrieval of thousands if not millions of unrelated files/sites the user is not interested in. Time and system processing are also sacrificed when searching massive databases for possible yet unrelated files.

It is generally agreed in the field of information retrieval (IR) that it is important to ensure that the documents displayed to a user be ordered according to relevance, with the most relevant displayed first. In some applications involving search over large collections of documents, such as search within a company's corporate domain, human editors review the most common search terms and select documents that should be displayed in future in response to those query terms. For example, the human editors might select solutions to common problems experienced by users. As can be appreciated, manual processing over hundreds or thousand of terms can be time consuming and inefficient.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that facilitate information retrieval and management via one or more learning methods that are trained according to positive and negative test data in order to determine an item's relevance such as from documents or links that suggest other sites of useful information. In one aspect, the present invention employs a set of manually selected documents or items (termed "best bets") to train a machine-learned text classifier. The classifier can process hand or machine-selected best bets (i.e., positive cases) and other documents selected by a conventional statistical search (i.e., negative cases) to build a model of what identifies a best bet document. After training, the classifier (or classifiers) and the model can be applied to new query terms to identify best bet documents. This includes bootstrapping new models over various training iterations to facilitate a growing model of learned expressions that can be employed for more accurate information retrieval activities.

In one example aspect, the classifier can be used in one of several applications. This can include a tool that aids human editors in selecting best bets in an offline scenario, for example. In an online example, a filter can be run on the output of a conventional statistical search, with "best bets" placed, displayed, or ranked before non-best bets or items of determined lower importance. Alternatively, all documents can be ranked according to the probability that they are a best bet. The effect of any of these scenarios and others is to increase the precision (i.e., relevance) of the top-ranked documents.

The present invention can be implemented according to a variety of differing manners that assist management and retrieval of information. For example, a search analyst or administrator can run a text search with a classification tool, then receive suggestions for best bets or relevance ranking and select sites or links for associated best bets. In an online situation, the ultimate end-user of search sites can be provided with top or ranked result lists. Thus, a query-independent classification is employed to determine the best/most relevant sites in a given context.

With regards to bootstrapping, a system can initially be supplied with human-selected best bets. The training data can be augmented with each training iteration using machine suggested and human-verified best bets derived out of the new model in each iteration. The best bets may be hand-selected by an editor going through all respective content, or the system may have inferred that items are probably best by observing which documents users tend to select, for example. In the latter case, the invention can maximize the likelihood of displaying the types of documents or items that users are likely to think are interesting enough to view or retrieve.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology that applies automated learning procedures for determining document relevance and assisting information retrieval activities. In one aspect, a system is provided that facilitates a machine-learned approach to determine document relevance. The system includes a storage component that receives a set of human selected items and/or machine selected items to be employed as positive test cases. A training component trains at least one classifier with the human selected items (or machine selected items) as positive test cases and one or more other items as negative test cases in order to provide a query-independent model, wherein the other items can be selected by a statistical search, for example. Also, the trained classifier can be employed to aid an individual in selecting new positive cases or utilized to filter a statistical-based search. Outputs of the filter can be ranked such that positive cases are ranked before negative cases, if desired or explicit indicia can be added to returned results that indicate relevance or importance. The outputs can also be ranked according to a probability they are a positive case, if desired.

As used in this application, the terms "component," "classifier," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
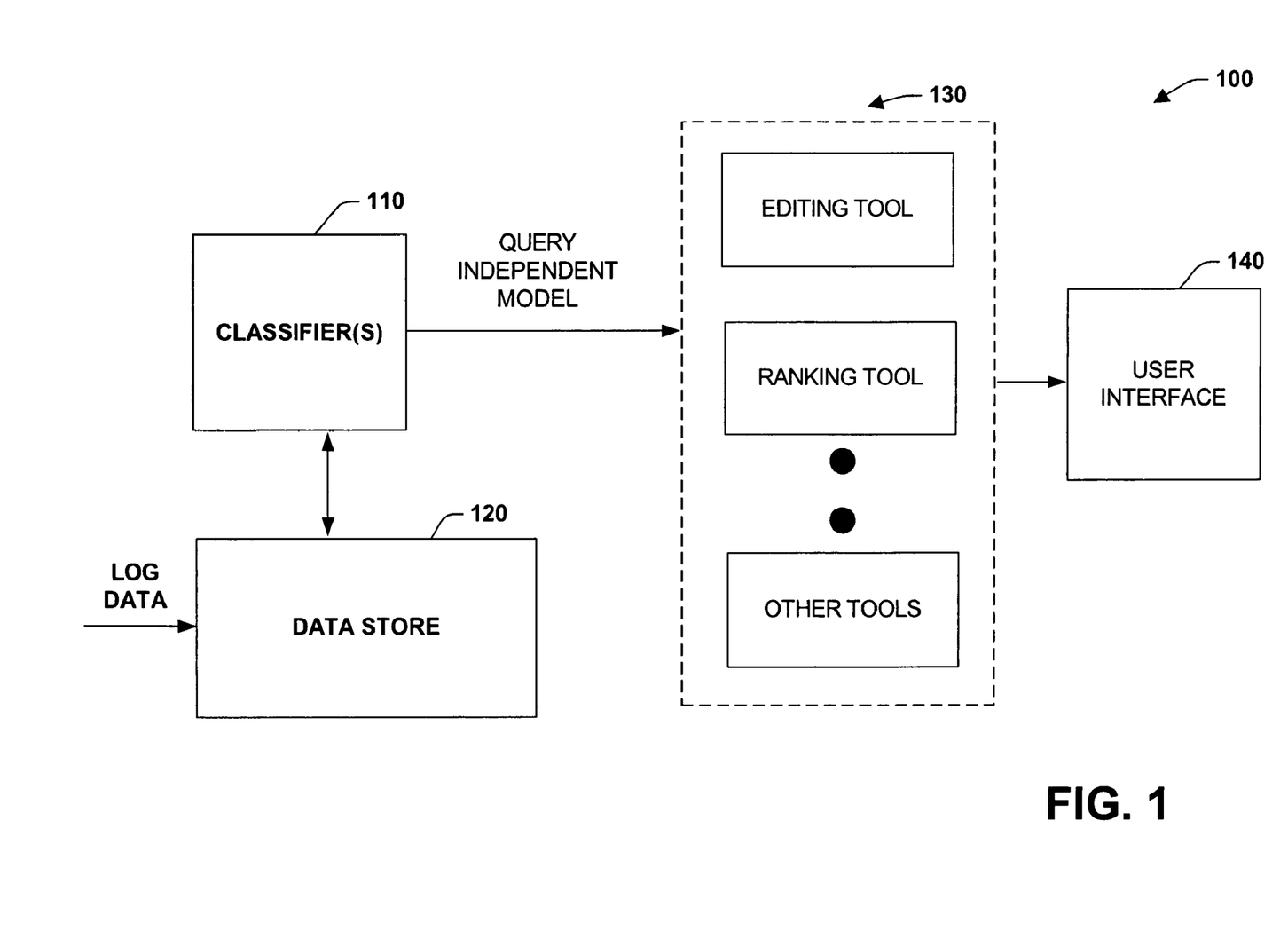
FIG. 1 is a schematic block diagram of a query-independent model and system in accordance with an aspect of the present invention.

Referring initially to FIG. 1, a query-independent model and system 100 is illustrated in accordance with an aspect of the present invention. The system 100 includes one or more classifiers 110 that analyze data stored in a data store 120 to provide a query-independent model. Such data can include logs (data gathered over time) of relevant sites of interest for users, documents, other data items, and so forth. The data store 120 can include information for a centralized store (e.g., company.com) or from divergent sources such as various web sites, document collections, encyclopedias and so forth. The classifiers 110 are employed to automatically analyze data in the store in order to assist one or more tools 130 that can interact with a user interface 140.

In one example, the tools 130 may include an editing tool that assists an administrator in selecting relevant sites to present to the user when they are searching for information. These sites can include ranked lists of sites that are presented in the most likely context or importance (i.e., best bet) to the user, wherein likelihood can be determined from the classifiers 110. Another tool 130 can include a ranking tool that can assist online users or end users with determining an item's importance based upon a determined ranking or categorization of information by the classifiers 110.

In general, the classifiers are trained according to positive and negative test data in order to determine an item's relevance such as from documents or links that suggest other sites of useful information. In one aspect, this includes a set of manually selected documents or items (termed "best bets") to train a machine-learned text classifier 110 (or classifiers). The classifier 110 can process hand or machine-selected best bets (i.e., positive cases) and other documents selected by a conventional statistical search (i.e., negative cases) that are stored in the data store 120. After training, the classifier 110 can be applied to new query terms to identify best bet or relevant documents. This includes bootstrapping new models over various training iterations to facilitate a growing model of learned expressions that can be employed for more accurate information retrieval activities that is described in more detail below.

In one example, the classifier 110 can be utilized in one of several applications. This can include a tool 130 that aids human editors or machines in selecting best bets in an offline scenario, for example. In an online example or user query example, a filter (not shown) can be run on the output of a conventional statistical search, with "best bets" placed, displayed, or ranked before non-best bets or items of determined lower importance. Alternatively, all or a subset of documents can be ranked according to the probability that they are a best bet. The effect of any of these scenarios and others is to increase the precision (i.e., relevance) of the top-ranked documents.

The user interface 140 can also be employed to update, change or modify the data store 120 if desired and analyze, process, and receive classified results. The interface 140 can include a display (not shown) having one or more display objects (not shown) that can include such aspects as configurable icons, buttons, sliders, input boxes, selection options, menus, tabs and so forth having multiple configurable dimensions, shapes, colors, text, data and sounds to facilitate operations with the system 100. In addition, one or more user inputs (not shown) can be provided that include a plurality of other inputs or controls for adjusting and configuring one or more aspects of the present invention. This can include receiving user commands from a mouse, keyboard, speech input, web site, browser, remote web service and/or other device such as a microphone, camera or video input to affect or modify operations of the system 100.

The classifiers 110 can be implemented according to a plurality of techniques. According to one aspect of the invention, Support Vector Machines (SVM) which are well understood are employed as the classifiers. It is to be appreciated that other classifier methods may also be employed such as Naive Bayes, Bayes Net, decision tree, similarity-based, vector-based, Hidden Markov Models, and/or other learning methods. SVM's are configured via a learning or training phase. A classifier is a function that maps an input attribute vector, $x=(x1, x2, x3, x4, xn)$, to the confidence that the input belongs to a class—that is, $f(x)$ =confidence(class). In the case of topic classification, attributes are words in a query or other domain-specific attributes derived from the words in a query (e.g., parts of speech, presence of key terms), and the classes are the categories or areas of interest. An important aspect of SVMs and other learning approaches is to employ a training set of labeled instances to learn a classification function automatically.

A training set may include a subset of terms 1 through N that indicate potential and/or actual elements or element combinations (e.g., words or phrases) that are employed to inquire about a particular topic. Each term can be associated with one or more topics (e.g., (Q1, T2, T3, T9), (Q7, T2, T6), (Q2, T5)). During learning, a function that maps the input features to a confidence of class is learned. Thus, after learning a model, respective topics are represented as a weighted vector of input features. It is noted that other implementations of terms, queries and/or topics are possible. For example, another generalization can be employed to train not only on queries for topics and subtopics, but also on the raw text associated with a target content and/or documents. In other words, a system can be seeded with a few queries, but provided with a plurality of raw text, and also add not only queries but raw text later to enhance the system.

For topic classification, binary feature values (e.g., a word occurs or does not occur in a topic), or real-valued features (e.g., a word occurs with importance weight r) are often employed. Since topic collections may contain a large number of unique terms, a feature selection is generally employed when applying machine-learning techniques to topic categorization. To reduce the number of features, features may be removed based on overall frequency counts, and then selected according to a smaller number of features based on a fit to the categories. The fit to category can be determined via mutual information, information gain, chi-square and/or any other statistical selection techniques. These smaller descriptions then serve as input to the SVM. It is noted that linear SVMs provide suitable generalization accuracy and provide fast learning. Other classes of nonlinear SVMs include polynomial classifiers and radial basis functions and may also be utilized with the present invention.

For many learning methods, including the SVM, the model for each category can be represented as a vector of feature weights, w (e.g., $w1, w2, \ldots wv$). Thus, there is a learned vector of weights for each category. When the weights are learned, new queries are classified by computing the dot product of x and w, wherein w is the vector of learned weights for the respective categories, and x is the vector representing a new query. A sigmoid function may also be provided to transform the output of the SVM to probabilities. Probabilities provide comparable scores across categories or classes.

An SVM is a parameterized function whose functional form is defined before training. Training an SVM generally requires a labeled training set, since the SVM will fit the function from a set of examples. The training set consists of a set of E examples, E being an integer. Each example consists of an input vector, x, and a category label, y, which describes whether the input vector is in a category. For each category there are E free parameters in an SVM trained with E examples. To find these parameters, a quadratic programming (QP) problem is solved as is well understood. There is a plurality of well-known techniques for solving the QP problem. These techniques may include a Sequential Minimal Optimization technique as well as other techniques such as chunking.

Figure 2:
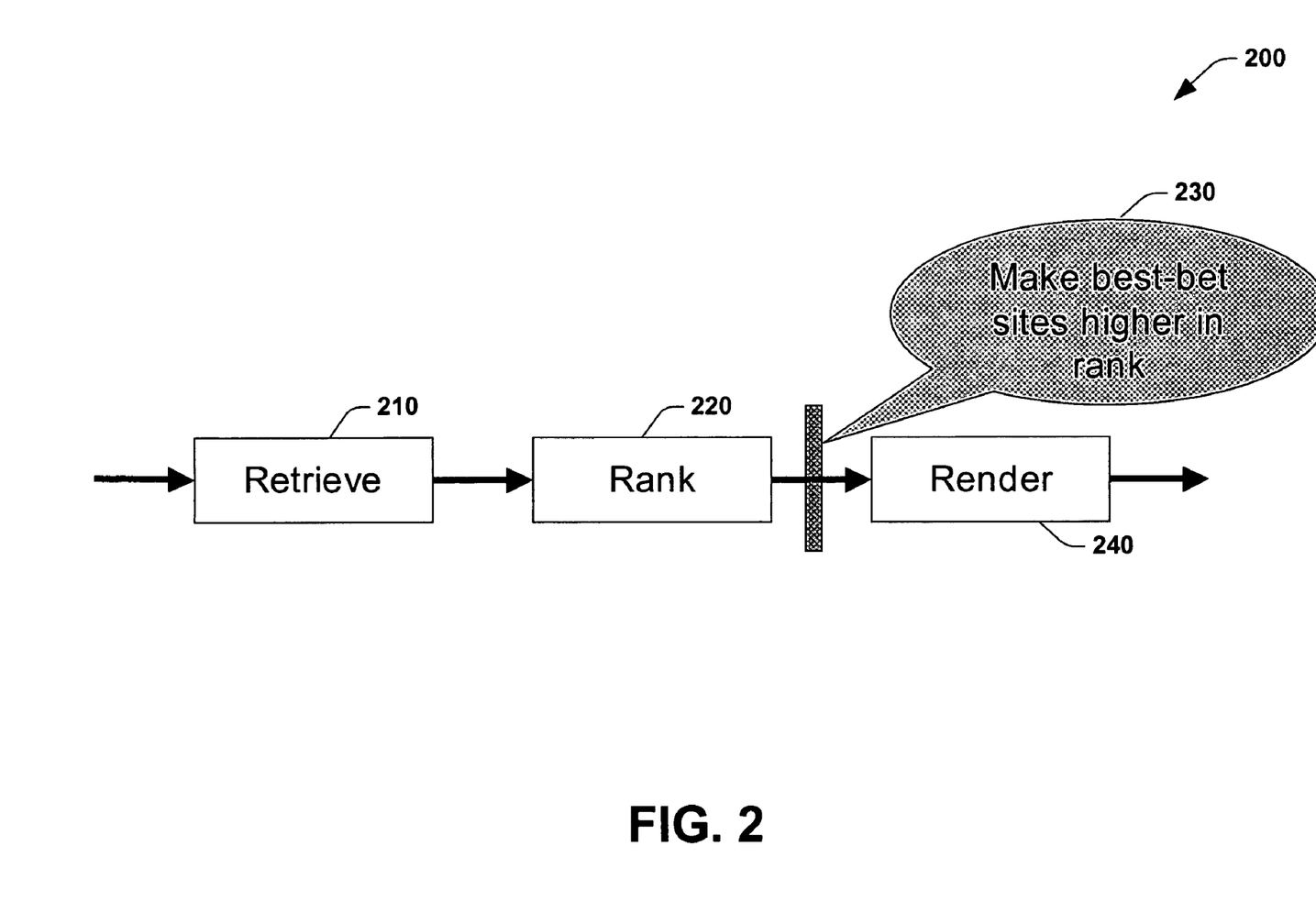
FIG. 2 is a diagram of an example document ranking process in accordance with an aspect of the present invention.

Referring now to FIG. 2, an example document re-ranking process 200 is illustrated in accordance with an aspect of the present invention. This can include post-processing of information to determine a document or site's relevance to a user or administrator. In this aspect data such as items, documents, logs, terms and so forth are retrieved at 210 and automatically ranked at 220 according to the classification techniques described above. At 230, items having a higher probability of being relevant are rendered to a user at 240 before items of lower ranking. Such ranking can be achieved according to predetermined probability thresholds, wherein items having a higher probability of being relevant are presented before items of lower probability. It is to be appreciated however that rather than an implicit ranking according to probability, that explicit annotations can be added to displayed items to indicate a document or site's relevance or importance (e.g., employ colors, numbers, symbols that indicate a documents relevance).

Figure 3:
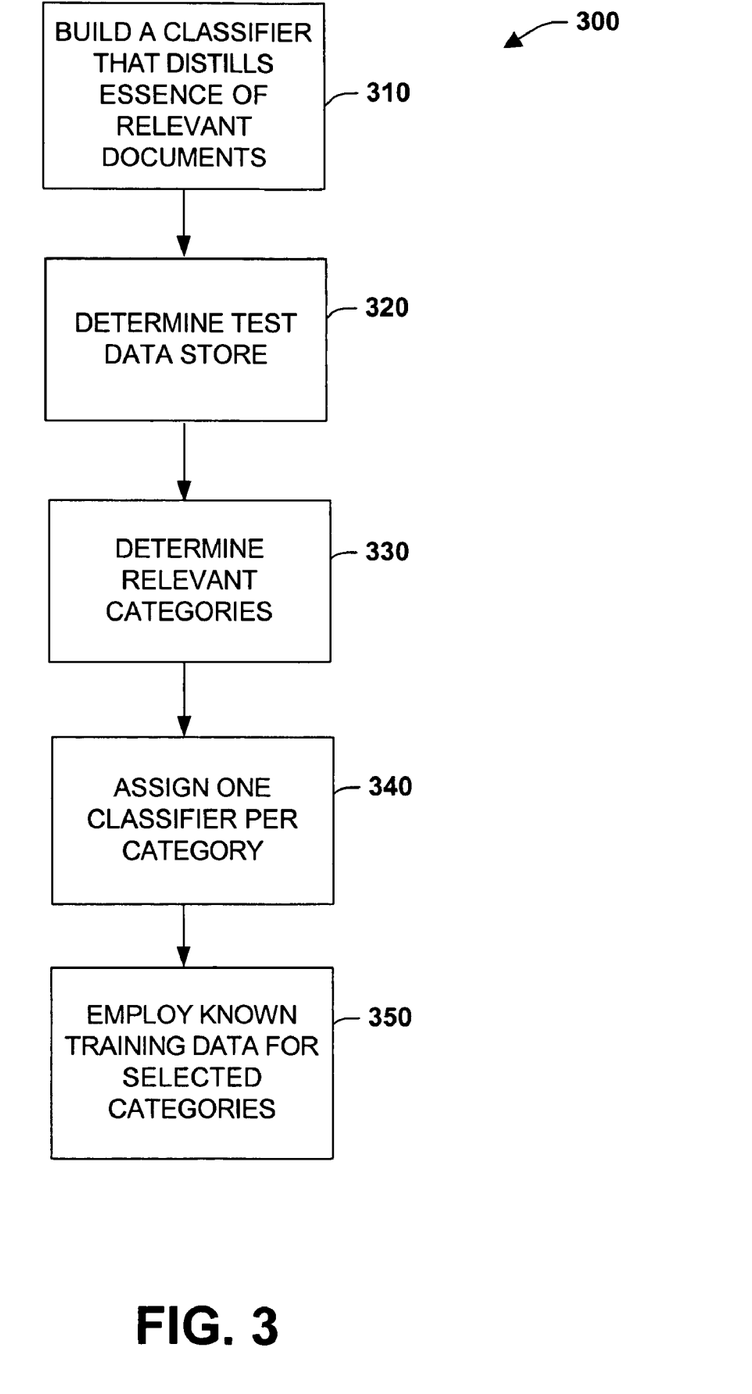
FIG. 3 is a flow diagram illustrating an example modeling process in accordance with an aspect of the present invention.
Figure 4:
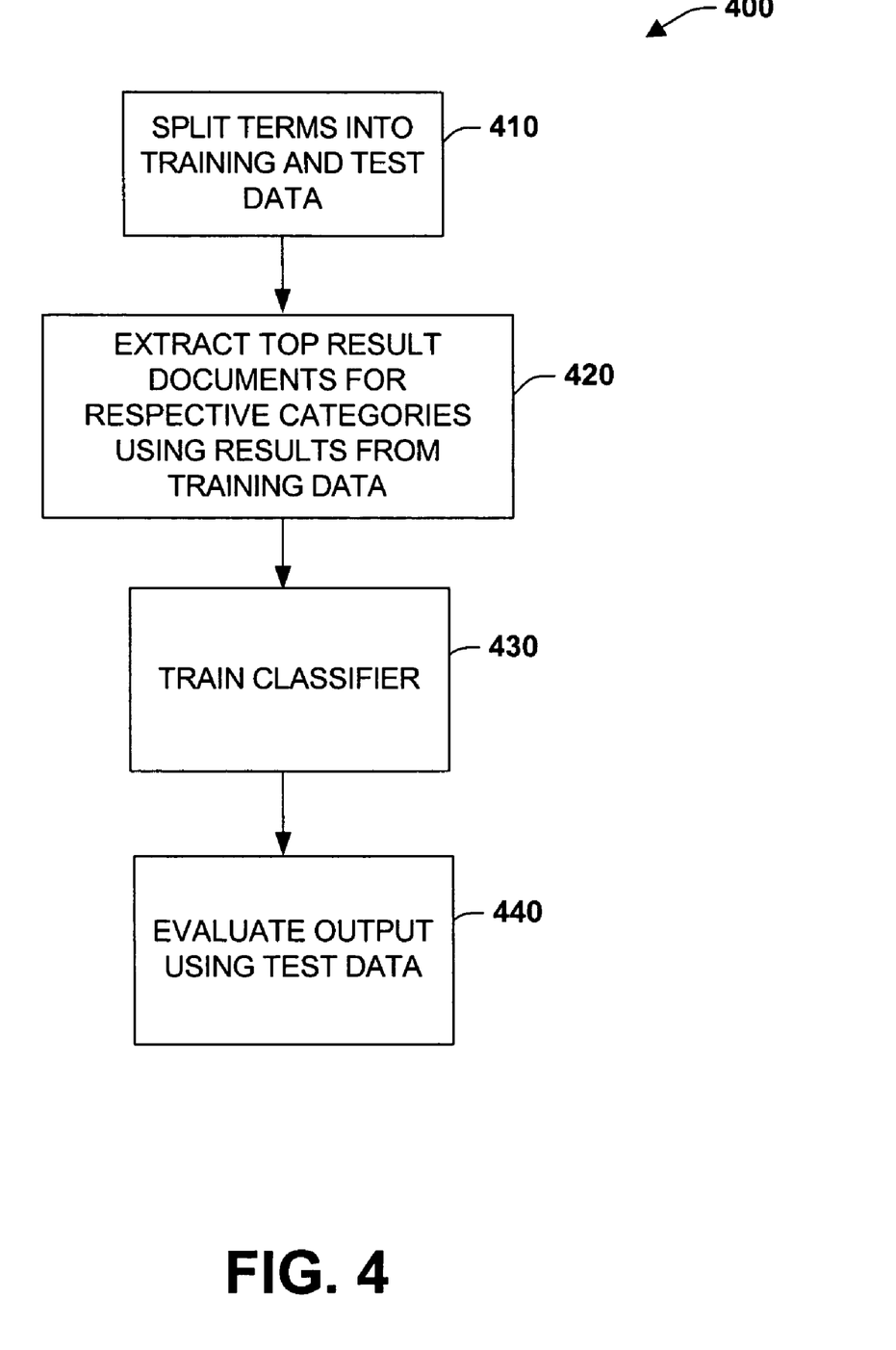
FIG. 4 is a diagram illustrating an example training and test process in accordance with an aspect of the present invention.

FIGS. 3 and 4 are flow diagrams illustrating modeling and training processes in accordance with an aspect of the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Turning to FIG. 3, an example modeling process 300 is illustrated in accordance with an aspect of the present invention. At 310, at least one text classifier is constructed that is employed to distill or determine the essence of best bet documents or sites. At 320, test data store to analyze is selected. For example, this may include a proprietary domain having various topics or terms or include a plurality of domains spread across various local or remote databases. At 330, one or more categories are selected from the domain (e.g., communities, downloads, partners, product info, support, technical, training, corporate info, and so forth). At 340, at least one classifier is assigned to a respective category in order to learn characteristics of best bets within a respective category. At 350, a known training data set is employed to train and test the category classifiers which is described in more detail below with respect to FIG. 4.

FIG. 4 illustrates an example training and test process 400 in accordance with an aspect of the present invention. Proceeding to 410, terms from a database are split into a training data set and a test data set (e.g., 80% of terms employed for training, 20% of terms employed for testing classifiers). At 420, the top result documents for each category and for each term are extracted (e.g., extract top 10 documents). At 430, the respective category classifiers are trained on the extracted results of 420 (e.g., via employment of word features). At 440, the training data described above is then analyzed by the trained classifiers to determine classifier accuracy. For example, this can include comparisons between category accuracies as determined by the classifiers versus baseline estimations such as in the following table:

| Category (# features) | Category Accuracy | Category Baseline |
|---|---|---|
| Communities (1K) | 97.81 | 88.86 |
| Downloads (1K) | 92.06 | 76.02 |
| Partners (1K) | 96.86 | 91.11 |
| Product Info (10K) | 89.25 | 75.22 |
| Support (1K) | 96.09 | 79.28 |
| Technical (10K) | 93.36 | 86.33 |
| Training (1K) | 89.80 | 88.78 |
| Corp Info (10K) | 96.93 | 92.40 |

Figure 5:
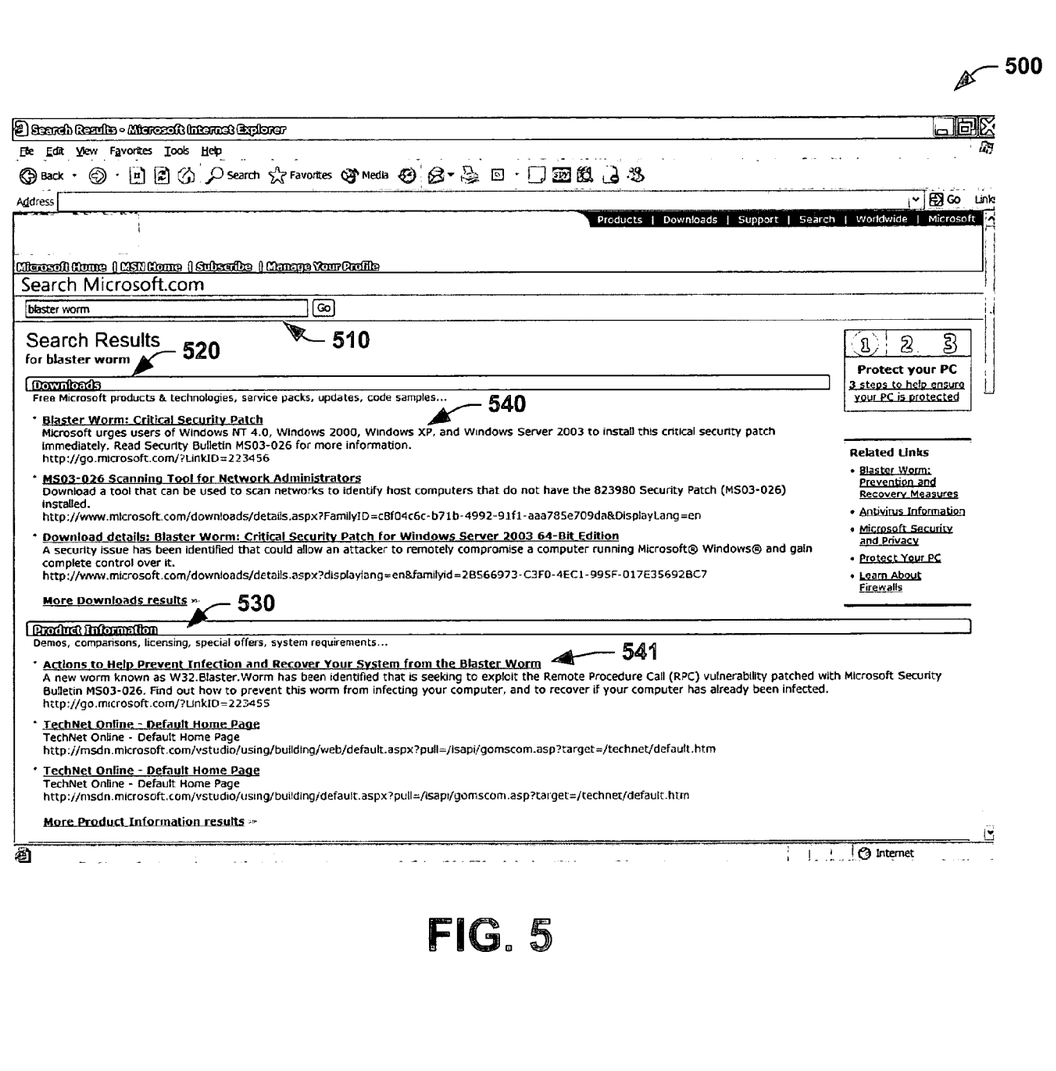
FIG. 5 is a diagram illustrating an exemplary user interface for site ranking in accordance with an aspect of the present invention.
Figure 6:
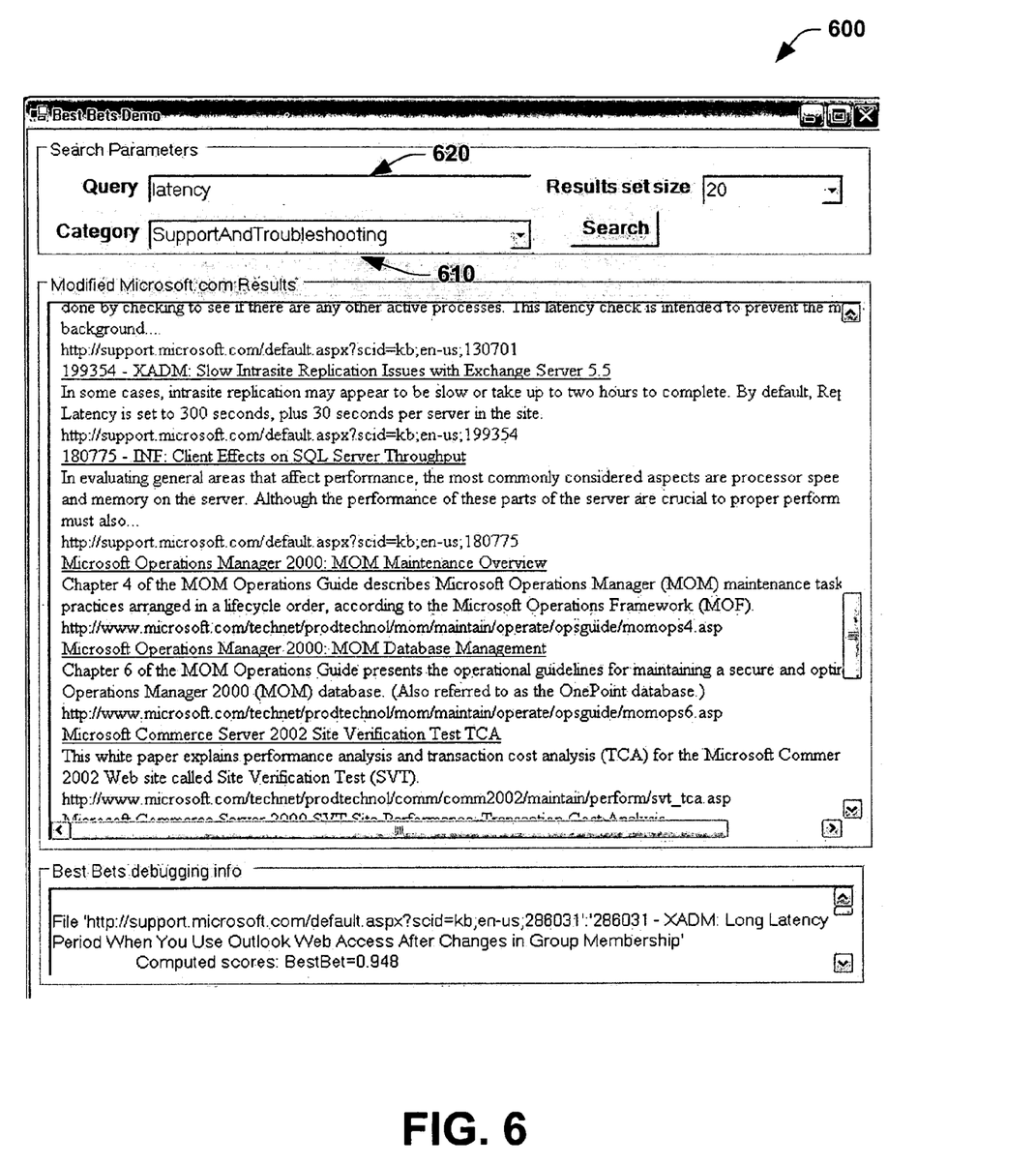
FIG. 6 is a diagram illustrating an exemplary user interface for online ranking in accordance with an aspect of the present invention.

FIG. 5 illustrates an exemplary user interface 500 for site ranking in accordance with an aspect of the present invention. In this aspect, an example search term (e.g., blaster worm) is submitted to a data site adapted in accordance with the present invention at 510. The site may be split into various categories 520 and 530. Results 540, 541 etc. in each of these categories may include best bet links to sites that provide more information relating to the desired terms. FIG. 6 depicts an exemplary user interface 600 for online ranking in accordance with an aspect of the present invention. In this aspect, the interface 600 ranks documents in a category 610 according to query terms 620 submitted by a user. As noted above, this can include an implicit ordering on the interface 600, wherein more relevant documents are presented before other documents.

Figure 7:
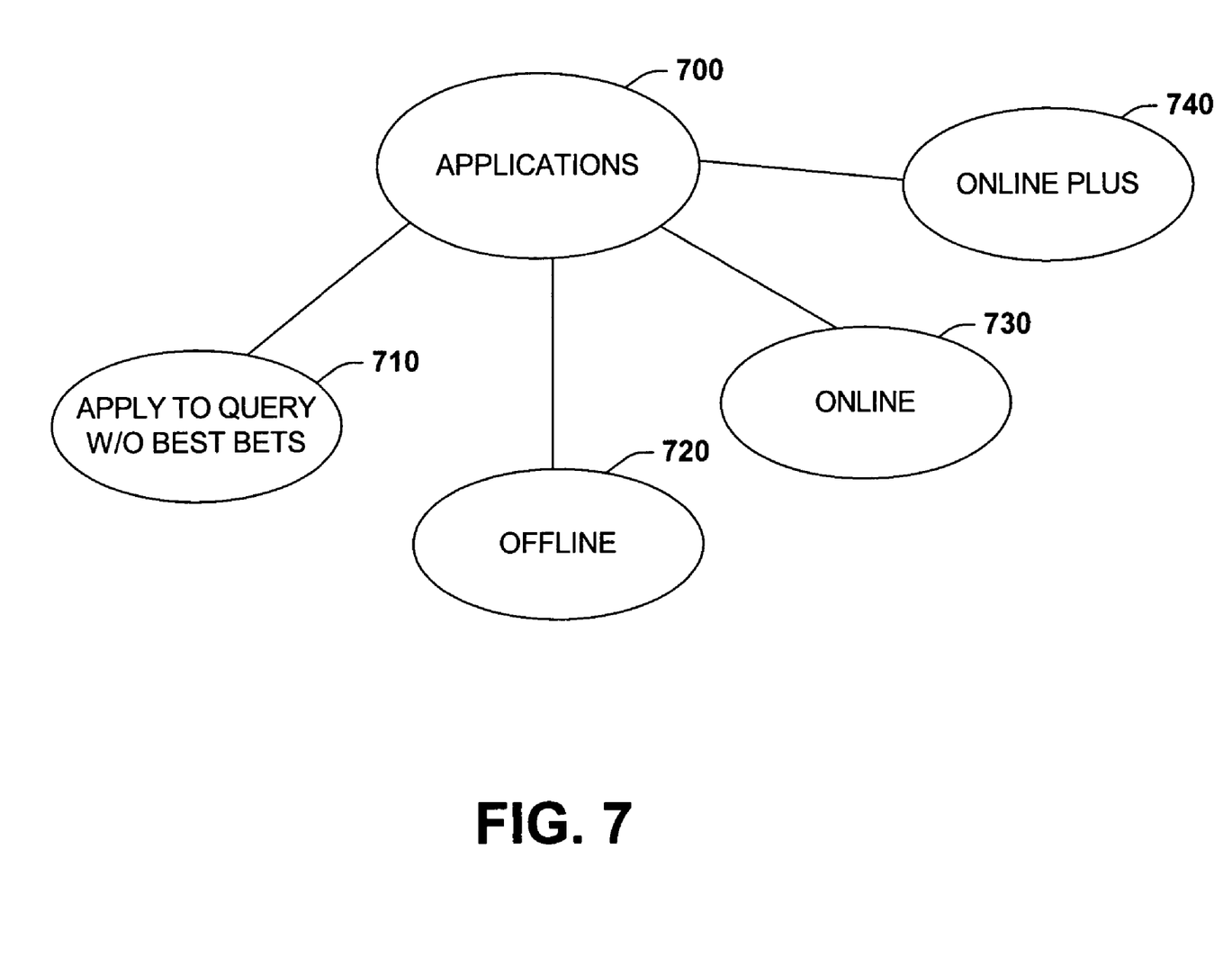
FIG. 7 is a diagram illustrating example applications in accordance with an aspect of the present invention.

FIG. 7 depicts example applications 700 in accordance with an aspect of the present invention. The applications 700 include one or more possible usage scenarios although it is to be appreciated that other applications may be employed. At 710, one case applies to queries and documents related to these queries that have previously not been processed according to best bets analysis. At 720, offline processing may include processing the top n queries from logs (n being an integer), getting search results for these queries, identifying best bet candidates from among the results, and forwarding this analysis to editors who determine whether or not a piece of information is desirable to be presented for a given query or topic. At 730, an online process may include extracting best bets from a list of potential documents or sites and automatically placing the best bets before other techniques such as statistical processing of the potential items. At 740, online techniques may also include re-ranking results by a probability that an item is a best bet.

Figure 8:
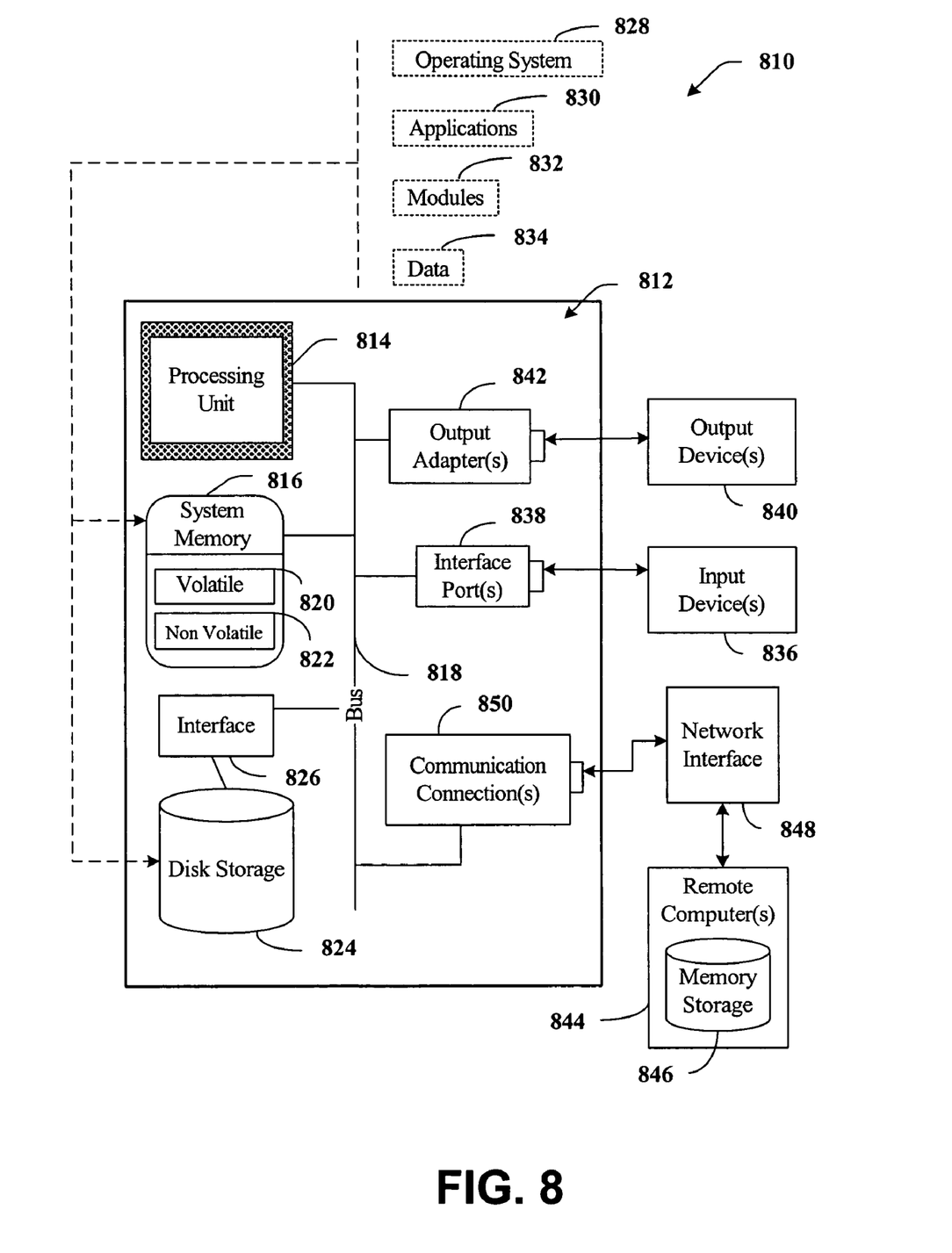
FIG. 8 is a schematic block diagram illustrating a suitable operating environment in accordance with an aspect of the present invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
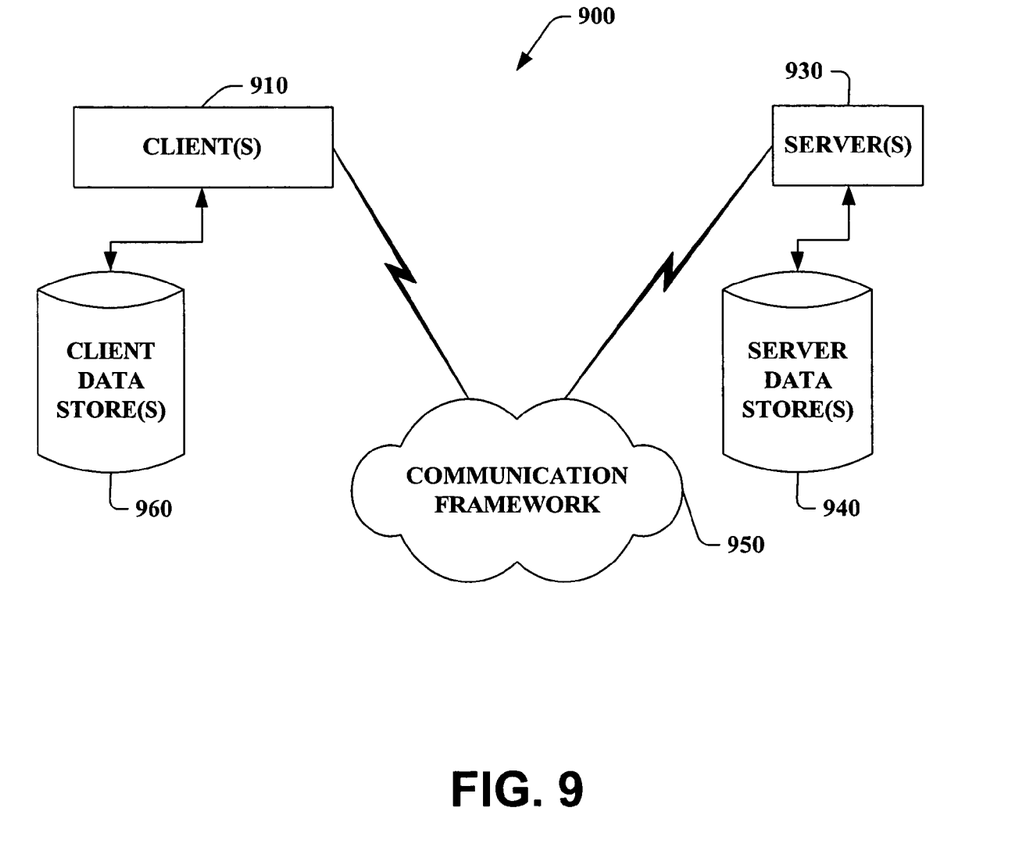
FIG. 9 is a schematic block diagram of a sample-computing environment with which the present invention can interact.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates a machine-learned approach to determine document relevance, comprising:
   a storage component that receives a set of human or machine selected items to be employed as positive test cases; and
   a training component that trains at least one classifier with the human or machine selected items as positive test cases and one or more other items as negative test cases in order to provide a query-independent model, the trained classifier is employed to filter documents obtained from statistical-based or probabilistic-based searches.

2. The system of claim 1, the negative test cases selected by a statistical search.

3. The system of claim 1, the trained classifier is employed to aid an individual in selecting new positive cases.

4. The system of claim 1, outputs of the filter are ranked such that positive cases are ranked before negative cases.

5. The system of claim 1, the outputs are ranked according to a probability they are a positive case.

6. The system of claim 1, the storage component includes logs of relevant sites of interest for users, documents, or data items.

7. The system of claim 6, the storage component includes information for a centralized store or from divergent sources such as web sites, document collections, encyclopedias, local data sources and remote data sources.

8. The system of claim 1, the classifier is employed to automatically analyze data in the storage component in order to assist one or more tools that can interact with a user interface.

9. The system of claim 8, the tools include at least one of an administrative tool, an editing tool, and a ranking tool.

10. The system of claim 8, the tools are employed in at least one of an online and an offline manner.

11. The system of claim 1, the classifiers are trained according to positive and negative test data in order to determine an item's relevance such as from documents or links that suggest other sites of useful information.

12. The system of claim 11, further comprising a set of manually selected documents or items to train a machine-learned classifier.

13. The system of claim 11, the classifier is applied to new terms to identify best bet or relevant documents.

14. The system of claim 11, further comprising bootstrapping new models over various training iterations to facilitate a growing model of learned expressions that are employed for more accurate information retrieval activities.

15. The system of claim 14, further comprising best bets that are hand-selected by an editor.

16. The system of claim 15, further comprising a component to maximize a likelihood of displaying types of documents or items that users are likely to think are interesting enough to view or retrieve.

17. The system of claim 1, the classifier includes at least one of the following learning techniques: Support Vector Machines (SVM), a Naive Bayes, a Bayes Net, a decision tree, similarity-based, a vector-based, a Hidden Markov Model, or other learning technique.

18. The system of claim 1, further comprising a component to perform post-processing of information to determine a document or site's relevance to a user or administrator.

19. The system of claim 18, the post-processing includes ranking in accordance with predetermined probability thresholds, items having a higher probability of being relevant are presented before items of lower probability.

20. The system of claim 18, further comprising explicit annotations that are added to displayed items to indicate a document or site's relevance or importance.

21. A computer readable medium having computer readable instructions stored thereon for implementing the training component and the storage component of claim 1.

22. A computer-based information retrieval system, comprising:
  means for determining a training set for data terms;
  means for automatically classifying the training set;
  means for determining new items from the classified training set; and
  means for presenting the new items in accordance with an information retrieval request.

23. The system of claim 22, further comprising means for testing the classified training set.

24. A computer-implemented method to facilitate automated information retrieval, comprising:
  processing n queries from a data log, n being an integer;
  identifying relevant candidates from the n queries; and
  training classifiers to identify other relevant candidates for subsequent search activities.

25. The method of claim 24, farther comprising forwarding an analysis to an editor that determines whether or not a piece of information is desirable to be presented for a given query or topic.

26. The method of claim 24, farther comprising extracting relevant candidates from a list of potential documents or sites and automatically placing the best bets before other statistical rankings.

27. The method of claim 24, further comprising re-ranking results by a probability that a document is relevant, respective documents are downloaded, and terms are extracted and looked-up for terms appearing in the document.

28. The method of claim 24, farther comprising determining at least one category to be classified.

29. The method of claim 28, further comprising employing a subset of a training data set to test the classified categories.

30. A computer readable medium having a data structure stored thereon, comprising:
  a first data field related to a training data set for a relevance category;
  a second data field that relates to a new set of data items pertaining to the relevance category; and
  a third data field that relates to a probability ranking for the new set of data items.

* * * * *